(12) United States Patent
Bondugula et al.

(10) Patent No.: US 11,893,493 B2
(45) Date of Patent: *Feb. 6, 2024

(54) CLUSTERING TECHNIQUES FOR MACHINE LEARNING MODELS

(71) Applicant: EQUIFAX INC., Atlanta, GA (US)

(72) Inventors: Rajkumar Bondugula, Irving, TX (US); Piyush Patel, Peachtree City, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,608

(22) Filed: Sep. 20, 2022

(65) Prior Publication Data

US 2023/0008208 A1 Jan. 12, 2023

Related U.S. Application Data

(63) Continuation of application No. 16/875,658, filed on May 15, 2020, now Pat. No. 11,475,235.

(51) Int. Cl.
*G06N 3/082* (2023.01)
*G06N 20/00* (2019.01)
(Continued)

(52) U.S. Cl.
CPC .......... *G06N 3/082* (2013.01); *G06F 18/211* (2023.01); *G06F 18/2134* (2023.01);
(Continued)

(58) Field of Classification Search
CPC ......... G06F 16/60; G06F 16/63; G06N 20/00; G06N 21/251; H04L 67/1097; H04N 21/251
See application file for complete search history.

(56) References Cited

U.S. PATENT DOCUMENTS 7,558,803 B1    7/2009  De Ville
8,069,005 B2   11/2011  Fano et al.
(Continued)

OTHER PUBLICATIONS

U.S. Appl. No. 16/875,658, "Notice of Allowance", dated Jun. 10, 2022, 9 pages.
(Continued)

*Primary Examiner* — Yosef Kassa
(74) *Attorney, Agent, or Firm* — Kilpatrick Townsend & Stockton LLP (57) ABSTRACT

In some aspects, systems and methods for efficiently clustering a large-scale dataset for improving the construction and training of machine-learning models, such as neural network models, are provided. A dataset used for training a neural network model configured can be clustered into a first set of clusters and a second set of clusters. The neural network model can be constructed with a number of nodes in a hidden layer that is based on the number of clusters in the first set of clusters. The neural network can be trained based on training samples selected from the second set of clusters. In some aspects, the trained neural network model can be utilized to satisfy risk assessment queries to compute output risk indicators for target entities. The output risk indicator can be used to control access to one or more interactive computing environments by the target entities.

20 Claims, 7 Drawing Sheets

(51) Int. Cl.
*G06N 3/084* (2023.01)
*G06F 18/23213* (2023.01)
*G06F 18/211* (2023.01)
*G06F 18/2134* (2023.01)
*G06Q 40/03* (2023.01)
*G06N 3/04* (2023.01)

(52) U.S. Cl.
CPC ......... *G06F 18/23213* (2023.01); *G06N 3/04* (2013.01); *G06N 3/084* (2013.01); *G06N 20/00* (2019.01); *G06Q 40/03* (2023.01)

(56) References Cited

U.S. PATENT DOCUMENTS

| | | | | |
|---|---|---|---|---|
| 8,831,361 | B2* | 9/2014 | Pintsov | G06V 30/418 |
| | | | | 382/209 |
| 9,175,343 | B2 | 11/2015 | Tomaney et al. | |
| 9,632,994 | B2* | 4/2017 | Naim | G06F 40/279 |
| 9,852,384 | B2 | 12/2017 | Ghosh et al. | |
| 9,870,158 | B2* | 1/2018 | Vojnovich | G06F 3/061 |
| 9,875,486 | B2 | 1/2018 | Mastierov et al. | |
| 10,341,183 | B2 | 7/2019 | Annamaneni et al. | |
| 10,460,190 | B2* | 10/2019 | Sawada | G07G 1/0063 |
| 10,516,906 | B2 | 12/2019 | Arpteg | |
| 10,540,447 | B2* | 1/2020 | Jagan | G06F 40/30 |
| 10,803,252 | B2* | 10/2020 | Chatterjee | G06N 3/044 |
| 2019/0042947 | A1 | 2/2019 | Turner et al. | |
| 2020/0134439 | A1 | 4/2020 | Turner et al. | |

OTHER PUBLICATIONS

European Patent Application No. EP21173779.6, "Extended European Search Report", dated Feb. 17, 2022, 7 pages.
Musavi, et al., "On the Training of Radial Basis Function Classifiers", Neural Networks, vol. 5, No. 4, Jul. 1992, pp. 595-603.
Reddy, et al., "A Survey of Partitional and Hierarchical Clustering Algorithms", Data Clustering: Algorithms and Applications, Aug. 13, 2013, pp. 87-110.
Archetti et al., "A Hierarchical Document Clustering Environment based on the Induced Bisecting K-Means", Flexible Query Answering Systems, 7th International Conference, FQAS 2006, Milan, Italy, Jan. 2006, 12 pages.
European Application No. EP21173779.6, "Office Action", dated May 25, 2023, 7 pages.
Steinbach et al., "A Comparison of Document Clustering Techniques", Department of Computer Science and Engineering, University of Minnesota, May 23, 2000, pp. 1-20.

* cited by examiner

CLUSTERING TECHNIQUES FOR MACHINE LEARNING MODELS

CROSS-REFERENCES TO RELATED APPLICATIONS

This application is a continuation of and claims priority to and the benefit of U.S. patent application Ser. No. 16/875,658, filed May 15, 2020, entitled "CLUSTERING TECHNIQUES FOR MACHINE LEARNING MODELS" the entire contents of which is hereby incorporated by reference in its entirety and for all purposes.

TECHNICAL FIELD

The present disclosure relates generally to artificial intelligence. More specifically, but not by way of limitation, this disclosure relates to building and training machine learning models such as artificial neural networks for predictions or performing other operations.

BACKGROUND

In machine learning, artificial neural networks can be used to perform one or more functions (e.g., acquiring, processing, analyzing, and understanding various inputs in order to produce an output that includes numerical or symbolic information). A neural network includes one or more algorithms and interconnected nodes that exchange data between one another. The nodes can have numeric weights or other associated parameters that can be tuned, which makes the neural network adaptive and capable of learning. For example, the numeric weights can be used to train the neural network such that the neural network can perform the one or more functions on a set of input variables and produce an output that is associated with the set of input variables. It is difficult, however, to determine the structure of the neural networks, such as the number of nodes in the hidden layers, and the initial values of the weights and other parameters of the neural network. If these parameters are not properly initialized, the training of the neural network can be time-consuming, and the output produced by the neural network can be inaccurate.

SUMMARY

Various aspects of the present disclosure provide systems and methods for efficiently clustering a large-scale dataset for improving the construction and training of machine-learning models such as neural network models. A dataset used for training a neural network model can be clustered into a first set of clusters and a second set of clusters. The first set of clusters can be utilized to determine the structure of the neural network model, and the second set of clusters can be utilized to determine the training data for the neural network model.

The neural network model can be constructed to include a number of nodes in a hidden layer that is equal to a number of clusters in the first set of clusters. The neural network model can be trained based on training samples selected from the second set of clusters. The training samples can include predictor variables and training outputs corresponding to the predictor variables. The trained neural network model can be utilized to satisfy risk assessment queries. For example, for a risk assessment query for a target entity, an output risk indicator for the target entity can be computed by applying the trained neural network model to predictor variables associated with the target entity. The output risk indicator can be used to control access to one or more interactive computing environments by the target entity.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

The foregoing, together with other features and examples, will become more apparent upon referring to the following specification, claims, and accompanying drawings.

DETAILED DESCRIPTION

Some aspects of the disclosure relate to efficiently clustering a large-scale dataset into multiple clusters that can be used for improving machine-learning models such as neural network models. An example of a large-scale dataset is one that includes 200 million points of data, with each point of data having 100 attributes. A clustering process according to some examples presented herein can significantly reduce the computational complexity of processing the large-scale dataset while improving the quality of the clustered dataset.

In one example, a dataset used for training a neural network model, such as a neural network model configured for computing a risk indicator, can be clustered into a first set of clusters and a second set of clusters with a finer granularity. As such, the number of clusters in the second set of clusters is higher than the number of clusters in the first set of clusters. The first set of clusters can be utilized to determine the structure of the neural network model, such as the number of nodes in the hidden layers. The second set of clusters can be utilized to determine the training samples for the neural network model from a large dataset.

For example, the training samples can be generated by taking a number of samples from each of the clusters in the second set, where the number of samples taken from each cluster is is proportional to the size of that cluster. In this way, the training samples are representative of the data contained in the dataset. The training samples can include training predictor variables and training outputs corresponding to the predictor variables. The neural network model can be constructed to include a number of nodes in a hidden layer that is equal to the number of clusters in the first set of clusters. Initial values of the parameters associated with the hidden layer, such as the weights and biases, can be determined by training a logistic regression model using the training data falling in each cluster of the first set of clusters.

In some aspects, the trained neural network model can be utilized to satisfy risk assessment queries. For example, for a risk assessment query for a target entity, an output risk indicator for the target entity can be computed by applying the trained neural network model to predictor variables associated with the target entity. The output risk indicator can be used to control access to one or more interactive computing environments by the target entity.

As described herein, certain aspects provide improvements to machine learning by providing data-driven construction and training of the machine learning models. The data used by the neural network model is analyzed through clustering to facilitate the determination of the structure and initial settings of the neural network model. Compared with traditional model construction based on randomly initializing the structure of the neural network, the technology presented herein helps to select a network structure that matches the training data. Selecting a network structure that matches the training data can optimize or otherwise improve the performance of the neural network (e.g., the accuracy of precision of its outputs) and significantly reduce computing resource consumption involved in the training of the neural network. In addition, since the training data samples are selected based on the clusters, the training samples are representative of the data contained in the dataset thereby increasing the prediction accuracy of the neural network. Further, the clustering mechanism proposed herein, and thus the neural network structure determined based on the clustering, is based on a deterministic process and the results can be reproduced and traced if needed.

In addition, the clustering mechanism presented herein has significantly reduced the computational complexity of the clustering process. Compared with traditional hierarchical clustering algorithms, which require at least $O(N^2)$ computations with N being the number of data points to be clustered, the clustering presented herein requires only $O(N)$ computations. This computational reduction becomes more significant as the scale of the data set becomes higher and higher. For example, for a data set on the scale of 200 million data points, the traditional clustering algorithms would require years to complete whereas the clustering algorithm presented herein can be finished within a few hours.

Additional or alternative aspects can implement or apply rules of a particular type that improve existing technological processes involving machine-learning techniques. For instance, to determine the clusters of the dataset for building and training the neural network, a particular set of rules are employed to ensure the efficient clustering, such as the rules for selecting the cluster for further splitting, the rules for splitting existing clusters into further clusters and the rules for terminating the splitting. This particular set of rules allows the clustering to be performed more efficiently and accurately, thereby ensuring the accuracy and efficiency of the building and training of the neural network model. Furthermore, additional rules can be introduced in the training of the neural network to further increase the efficiency of the training, such as rules for initializing the parameters of the neural network based on the clustering. These particular rules enable the training to be completed faster with fewer computational resources, and the trained neural network to be stable and reliable.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Figure 1:
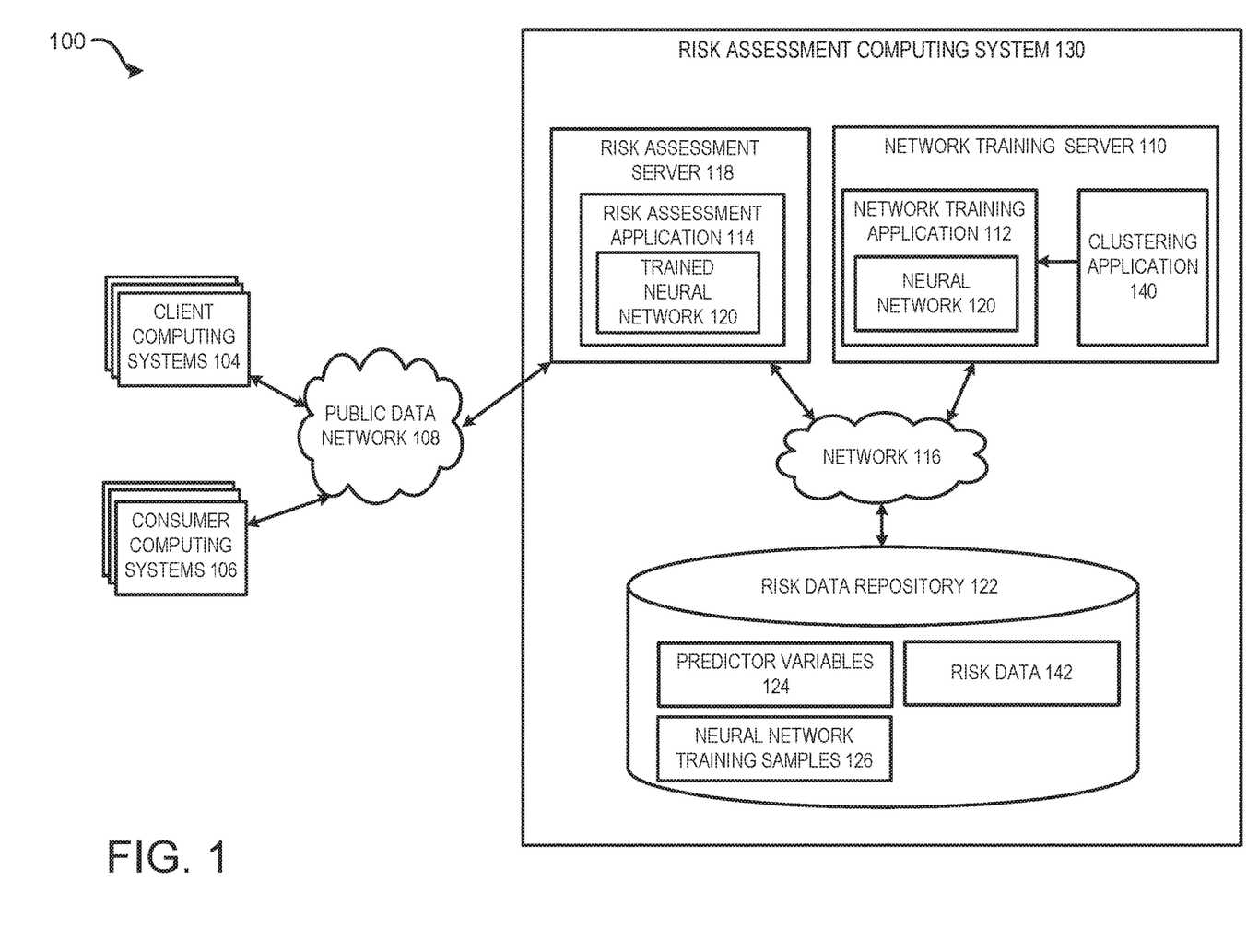
FIG. 1 is a block diagram depicting an example of an operating environment in which clustering is used to build and train a machine learning model for risk prediction according to certain aspects of the present disclosure.

FIG. 1 is a block diagram depicting an example of an operating environment 100 where the clustering is used to build and train a machine learning model for risk prediction. In this operating environment, a risk assessment computing system 130 builds and trains a neural network 120 that can be utilized to predict risk indicators of various entities based on predictor variables 124 associated with the respective entity. FIG. 1 depicts examples of hardware components of a risk assessment computing system 130, according to some aspects. The risk assessment computing system 130 is a specialized computing system that may be used for processing large amounts of data using a large number of computer processing cycles. The risk assessment computing system 130 can include a network training server 110 for building and training a neural network 120 for predicting risk indicators. The risk assessment computing system 130 can further include a risk assessment server 118 for performing risk assessment for given predictor variables 124 using the trained neural network 120.

The network training server 110 can include one or more processing devices that execute program code, such as a network training application 112 or a clustering application 140. The program code is stored on a non-transitory computer-readable medium. The network training application 112 can execute one or more processes to train and optimize a neural network 120 for predicting risk indicators based on predictor variables 124.

In some examples, the network training application 112 can build and train a neural network 120 utilizing neural network training samples 126. The neural network training samples 126 can include multiple training vectors consisting of training predictor variables and training risk indicator outputs corresponding to the training vectors. The neural network training samples 126 can be stored in one or more network-attached storage units on which various repositories, databases, or other structures are stored. Examples of these data structures are the risk data repository 122.

Network-attached storage units may store a variety of different types of data organized in a variety of different ways and from a variety of different sources. For example, the network-attached storage unit may include storage other than primary storage located within the network training server 110 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory or memory devices.

In some examples, the neural network training samples 126 can be generated from risk data 142 associated with various entities, such as users or organizations. The risk data 142 can include attributes of each of the entities. For example, the risk data 142 can include R rows and N columns for R entities, each row representing an entity and each column representing an attribute of the entity, wherein R and N are positive integer numbers. The risk data for each entity can also be represented as a vector with N elements/attributes. In some scenarios, the risk data 142 includes a large-scale data set, such as 200 million rows or vectors and each row/vector having more than 1000 attributes. The risk data 142 can also be stored in the risk data repository 122.

To generate the neural network training samples 126, the network training server 110 can execute a clustering application 140 configured for clustering data into multiple clusters. The neural network training samples 126 can be generated by clustering the risk data 142 into multiple clusters so that each data mode is represented by a cluster. As used herein, the data mode refers to the underlying characteristics of the data vectors or data points. A large data set might contain a large number of data modes. Randomly sampling this large data set without clustering might not capture all the data modes. Clustering the data set into clusters can help to group data with similar data modes together. As a result, sampling the data set by taking samples from each of the clusters can increase the chances of the sampled data points covering all the data modes. Therefore, the neural network training samples 126 can be generated by taking samples from each of the clusters that are proportional to the respective sizes of the clusters. In this way, the neural network training samples 126 are more representative of the data modes contained in the risk data 142 and the representation of a data mode is proportional to the size of that data mode.

In addition, the network training server 110 can also execute the clustering application 140 to determine the structure of the neural network 120 and initial settings of the neural network 120. For instance, the network training server 110 can execute the clustering application 140 to group the risk data 142 into multiple clusters, each cluster representing one segment of entities. The clustering in this example might be performed at a lower level of granularity than that of the clustering mentioned above for the generation of neural network training samples 126. The number of clusters can be used to set the number of nodes in the first hidden layer of a neural network 120.

Further, the data points in each of these clusters (which may be sampled in a way similar to that described above with respect to the generation of the neural network training samples 126) can be used to train a logistic model to determine the parameters of the logistic model. The parameters of these trained logistic models can be used to initialize the weights of the paths from the input layer to the first hidden layer of the neural network 120. The network training server 110 can further train the neural network 120 by freezing the weights and biases between the input layer and the first hidden layer to learn the rest of the parameters of the neural network 120. In another example, the weights and biases of additional hidden layers and the output layer of the neural network can be obtained similarly. For instance, the outputs of a previous hidden layer can be clustered using the clustering technologies presented herein. The number of generated clusters can be utilized to set the number of nodes in the current hidden layer. Each of the clusters can be used to train a logistic regression model. The parameters of the trained logistic regression models can be used to set or initialize the weights and biases associated with the nodes in the current hidden layer. Additional details regarding determining configurations of a neural network based on clustering are provided with regard to FIG. 2.

Note that while FIG. 1 and the above description show that the clustering application 140 is executed by the network training server 110, the clustering application 140 can be executed on another device separate from the network training server 110. The risk assessment server 118 can include one or more processing devices that execute program code, such as a risk assessment application 114. The program code is stored on a non-transitory computer-readable medium. The risk assessment application 114 can execute one or more processes to utilize the neural network 120 trained by the network training application 112 to predict risk indicators based on input predictor variables 124.

Furthermore, the risk assessment computing system 130 can communicate with various other computing systems, such as client computing systems 104. For example, client computing systems 104 may send risk assessment queries to the risk assessment server 118 for risk assessment, or may send signals to the risk assessment server 118 that control or otherwise influence different aspects of the risk assessment computing system 130. The client computing systems 104 may also interact with consumer computing systems 106 via one or more public data networks 108 to facilitate electronic transactions between users of the consumer computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by a seller, lender, or other providers of products or services. The client computing system 104 can include one or more server devices. The one or more server devices can include or can otherwise access one or more non-transitory computer-readable media. The client computing system 104 can also execute instructions that provide an interactive computing environment accessible to consumer computing systems 106. Examples of the interactive computing environment include a mobile application specific to a particular client computing system 104, a web-based application accessible via a mobile device, etc. The executable instructions are stored in one or more non-transitory computer-readable media.

The client computing system 104 can further include one or more processing devices that are capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces are used by a consumer computing system 106 to access various functions of the interactive computing environment. For instance, the interactive computing environment may transmit data to and receive data from a consumer computing system 106 to shift between different states of the interactive computing environment, where the different states allow one or more electronics transactions between the mobile device 102 and the host server system 104 to be performed.

A consumer computing system 106 can include any computing device or other communication device operated by a user, such as a consumer or a customer. The consumer computing system 106 can include one or more computing devices, such as laptops, smartphones, and other personal computing devices. A consumer computing system 106 can include executable instructions stored in one or more non-transitory computer-readable media. The consumer computing system 106 can also include one or more processing devices that are capable of executing program code to perform operations described herein. In various examples, the consumer computing system 106 can allow a user to access certain online services from a client computing system 104, to engage in mobile commerce with a client computing system 104, to obtain controlled access to electronic content hosted by the client computing system 104, etc.

For instance, the user can use the consumer computing system 106 to engage in an electronic transaction with a client computing system 104 via an interactive computing environment. An electronic transaction between the consumer computing system 106 and the client computing system 104 can include, for example, the consumer computing system 106 being used to query a set of sensitive or other controlled data, access online financial services provided via the interactive computing environment, submit an online credit card application or other digital application to the client computing system 104 via the interactive computing environment, operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and transaction management workflows, electronic fund transfers, etc. A user computing system 106 can be used to request access to the interactive computing environment provided by the client computing system 104, which can selectively grant or deny access to various electronic functions. Based on the request, the client computing system 104 can collect data associated with the user and communicate with the risk assessment server 118 for risk assessment. Based on the risk indicator predicted by the risk assessment server 118, the client computing system 104 can determine whether to grant the access request of the user computing system 106 to certain features of the interactive computing environment.

In a simplified example, the system depicted in FIG. 1 can configure a neural network to be used for accurately determining risk indicators, such as credit scores, using predictor variables. A predictor variable can be any variable predictive of risk that is associated with an entity. Any suitable predictor variable that is authorized for use by an appropriate legal or regulatory framework may be used.

Examples of predictor variables used for predicting the risk associated with an entity accessing online resources include, but are not limited to, variables indicating the demographic characteristics of the entity (e.g., name of the entity, the network or physical address of the company, the identification of the company, the revenue of the company), variables indicative of prior actions or transactions involving the entity (e.g., past requests of online resources submitted by the entity, the amount of online resource currently held by the entity, and so on.), variables indicative of one or more behavioral traits of an entity (e.g., the timeliness of the entity releasing the online resources), etc. Similarly, examples of predictor variables used for predicting the risk associated with an entity accessing services provided by a financial institute include, but are not limited to, indicative of one or more demographic characteristics of an entity (e.g., age, gender, income, etc.), variables indicative of prior actions or transactions involving the entity (e.g., information that can be obtained from credit files or records, financial records, consumer records, or other data about the activities or characteristics of the entity), variables indicative of one or more behavioral traits of an entity, etc.

The predicted risk indicator can be utilized by the service provider to determine the risk associated with the entity accessing a service provided by the service provider, thereby granting or denying access by the entity to an interactive computing environment implementing the service. For example, if the service provider determines that the predicted risk indicator is lower than a threshold risk indicator value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials and/or the dedicated web address, the user computing system 106 can establish a secure network connection to the computing environment hosted by the client computing system 104 and access the resources via invoking API calls, web service calls, HTTP requests, or other proper mechanisms.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the network training server 110 and the risk assessment server 118, may be instead implemented in a signal device or system.

Figure 2:
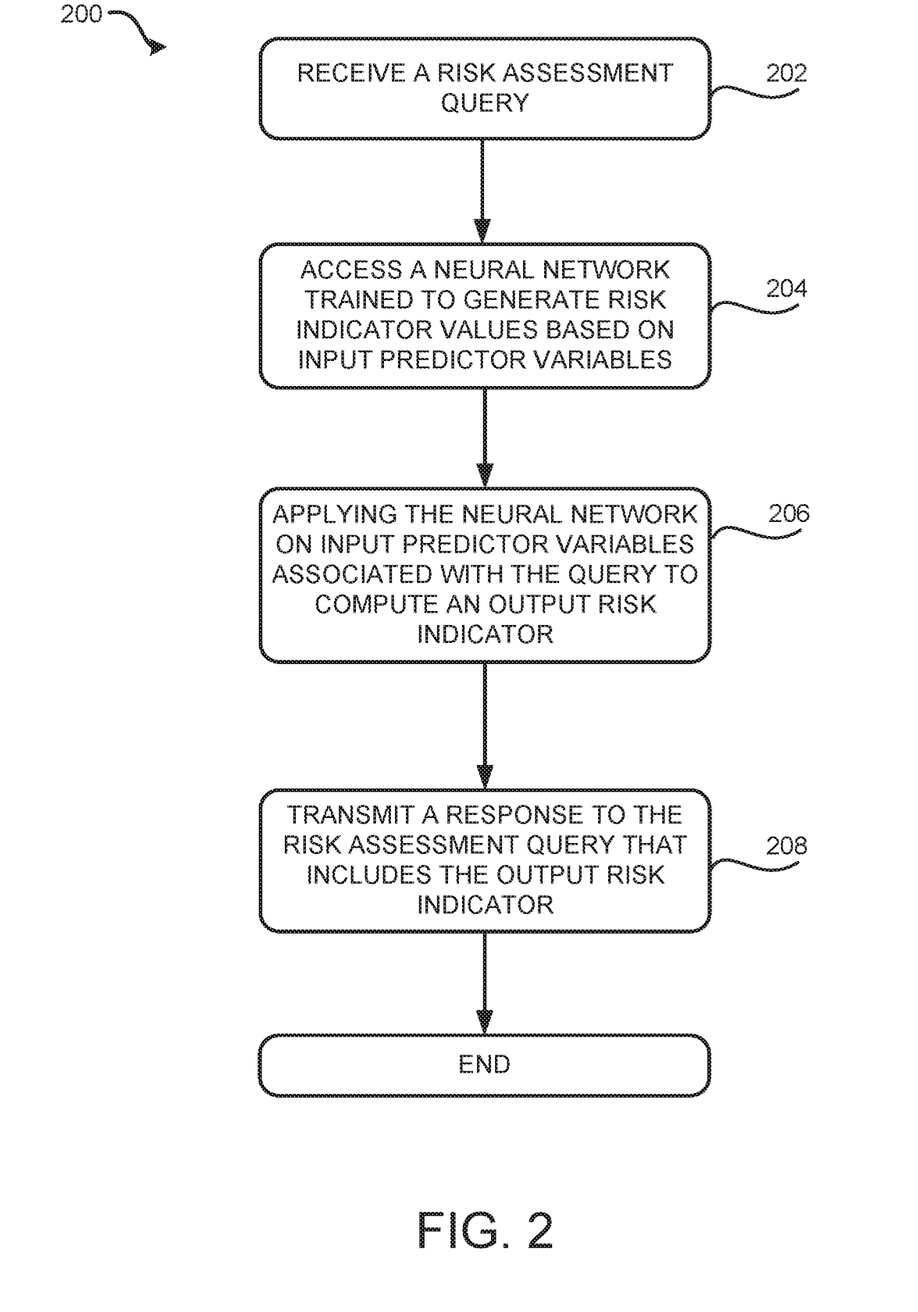
FIG. 2 is a flow chart depicting an example of a process for utilizing a neural network to generate risk indicators for a target entity based on predictor variables associated with the target entity according to certain aspects of the present disclosure.

FIG. 2 is a flow chart depicting an example of a process 200 for utilizing a neural network to generate risk indicators for a target entity based on predictor variables associated with the target entity. At operation 202, the process 200 involves receiving a risk assessment query for a target entity from a remote computing device, such as a computing device associated with the target entity requesting the risk assessment. The risk assessment query can also be received from a remote computing device associated with an entity authorized to request risk assessment of the target entity.

At operation 204, the process 200 involves accessing a neural network trained to generate risk indicator values based on input predictor variables or other data suitable for assessing risks associated with an entity. Examples of predictor variables can include data associated with an entity that describes prior actions or transactions involving the entity (e.g., information that can be obtained from credit files or records, financial records, consumer records, or other data about the activities or characteristics of the entity), behavioral traits of the entity, demographic traits of the entity, or any other traits that may be used to predict risks associated with the entity. In some aspects, predictor variables can be obtained from credit files, financial records, consumer records, etc. The risk indicator can indicate a level of risk associated with the entity, such as a credit score of the entity.

The neural network can be constructed and trained using training samples generated based on clustering the risk data 142 as described above. In some examples, the neural network 120 includes an input layer having N nodes each corresponding to a training predictor variable in an N-dimension input predictor vector. The neural network 120 further includes a hidden layer having M nodes and an output layer containing one or more outputs. The number of nodes in the hidden layer, M, can be determined based on the number of clusters generated by clustering the risk data 142 into user segments. In order to generate the neural network training samples 126, the clustering application 140 can further cluster the risk data 142 into clusters with a higher level of granularity. Sample data can be selected from each of the finer clusters in proportion to the size of the respective cluster. For example, one out of every 100 samples can be selected from each cluster in order to generate a set of neural network training samples 126 that has a size of 1% of the risk data 142. Neural network training samples 126 with other sizes can be generated similarly. Additional details regarding clustering the risk data 142 will be presented below with regard to FIGS. 3 and 4.

Depending on the type of the neural network 120, training algorithms such as backpropagation can be used to train the neural network 120 based on the generated neural network training samples 126. In some examples, the neural network training samples 126 can be grouped according to the user segments as discussed above which can be used to determine the number of hidden nodes in the hidden layer. These groups of neural network training samples 126 can each be used to train a separate logistic regression model. The parameters of the trained logistic regression models can be utilized to determine the weights and biases between the input layer and the hidden layer. The network training server 110 can further train the neural network model by freezing these determined weights and biases and learning the remaining parameters.

In other examples, the neural network can have more than one hidden layer. The number of nodes and the weight and bias associated with each node in each hidden layer can be determined in a similar way. For example, the number of nodes in the first hidden layer and the associated weights and biases can be determined as described above. For the second hidden layer, the outputs of the first hidden layer can be clustered and the number of clusters can be used to determine the number of nodes in the second hidden layer. Likewise, the outputs of the first hidden layer in each cluster can be utilized to train a separate logistic regression model. The parameters of these logistic regression models can be utilized to determine the weights and biases associated with the nodes in the second hidden layer. This process can be repeated for any number of hidden layers.

The weights and biases for the output layer can also be determined similarly. For example, the outputs of the last hidden layer can be clustered according to the number of nodes in the output layer. The outputs in each cluster can be utilized to train a corresponding logistic regression model. The parameters of these logistic regression models can be utilized to determine the weights and biases associated with the nodes in the output layer. Alternatively, or additionally, the weights and biases associated with the nodes in the output layer can be obtained using any neural network training method. The training can be performed by fixing the weights of the hidden layers to be the estimated weights and determining the weights and biases for the output layer. In other examples, the training can be performed by using the estimated weights for the hidden and output layers as the initial weights and the training can return optimized weights for all the layers.

At operation 206, the process 200 involves applying the neural network to generate a risk indicator for the target entity specified in the risk assessment query. Predictor variables associated with the target entity can be used as inputs to the neural network. The predictor variables associated with the target entity can be obtained from a predictor variable database configured to store predictor variables associated with various entities. The output of the neural network would include the risk indicator for the target entity based on its current predictor variables.

At operation 208, the process 200 involves generating and transmitting a response to the risk assessment query and the response can include the risk indicator generated using the neural network. The risk indicator can be used for one or more operations that involve performing an operation with respect to the target entity based on a predicted risk associated with the target entity. In one example, the risk indicator can be utilized to control access to one or more interactive computing environments by the target entity. As discussed above with regard to FIG. 1, the risk assessment computing system 130 can communicate with client computing systems 104, which may send risk assessment queries to the risk assessment server 118 to request risk assessment. The client computing systems 104 may be associated with banks, credit unions, credit-card companies, insurance companies, or other financial institutions and be implemented to provide interactive computing environments for customers to access various services offered by these institutions. Customers can utilize consumer computing systems 106 to access the interactive computing environments thereby accessing the services provided by the financial institution.

For example, a customer can submit a request to access the interactive computing environment using a consumer computing system 106. Based on the request, the client computing system 104 can generate and submit a risk assessment query for the customer to the risk assessment server 118. The risk assessment query can include, for example, an identity of the customer and other information associated with the customer that can be utilized to generate predictor variables. The risk assessment server 118 can perform a risk assessment based on predictor variables generated for the customer and return the predicted risk indicator to the client computing system 104.

Based on the received risk indicator, the client computing system 104 can determine whether to grant the customer access to the interactive computing environment. If the client computing system 104 determines that the level of risk associated with the customer accessing the interactive computing environment and the associated financial service is too high, the client computing system 104 can deny access by the customer to the interactive computing environment. Conversely, if the client computing system 104 determines that the level of risk associated with the customer is acceptable, the client computing system 104 can grant the access to the interactive computing environment by the customer and the customer would be able to utilize the various financial services provided by the financial institutions. For example, with the granted access, the customer can utilize the consumer computing system 106 to access web pages or other user interfaces provided by the client computing system 104 to query data, submit online digital application, operate electronic tools, or perform various other operations within the interactive computing environment hosted by the client computing system 104.

Figure 3:
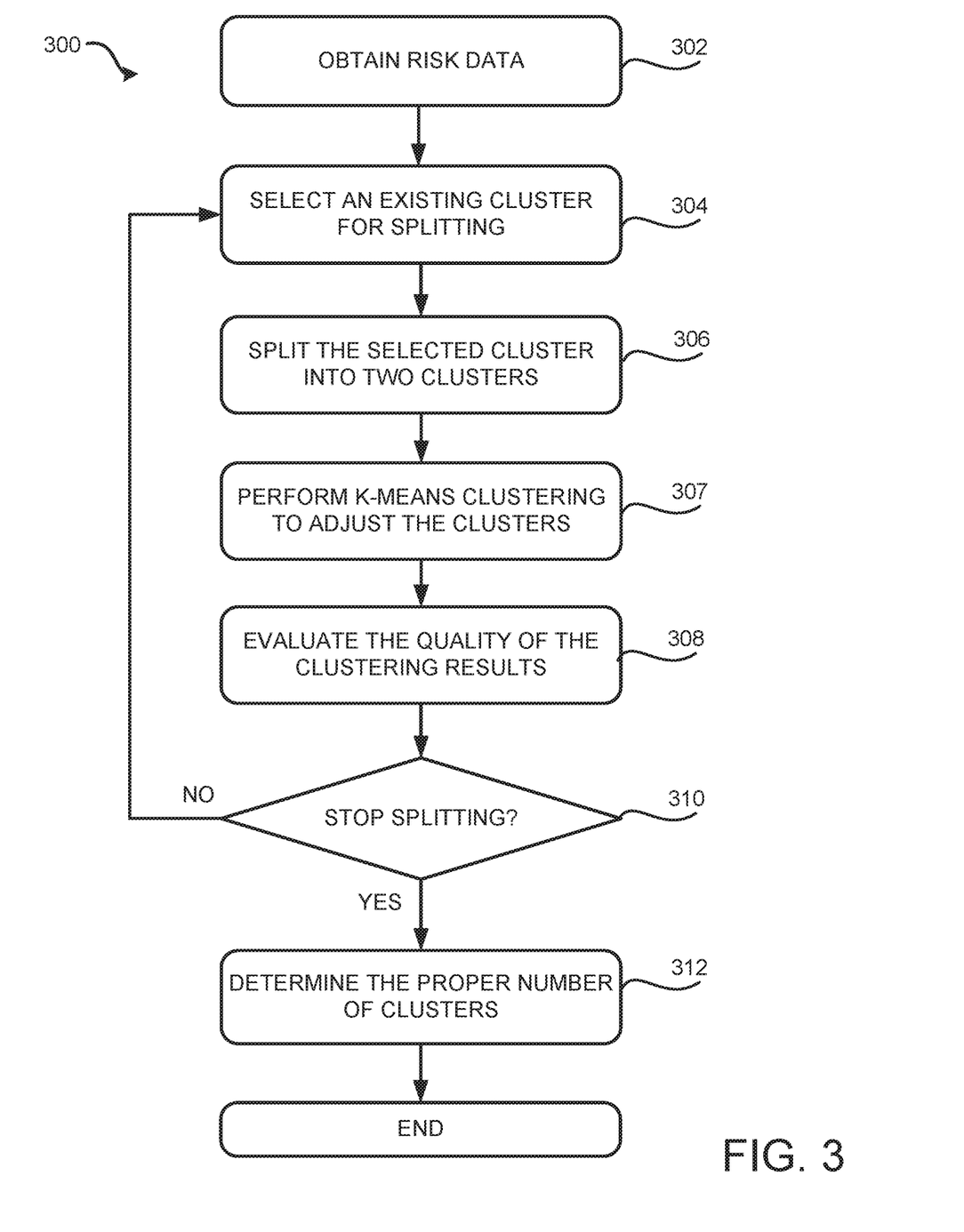
FIG. 3 is a flow chart depicting an example of a process for clustering risk data according to certain aspects of the present disclosure.

Referring now to FIG. 3, a flow chart depicting an example of a process 300 for clustering risk data 142 is presented. In this example, a modified bisecting K-means algorithm is executed to cluster the risk data 142. This process involves multiple iterations and each iteration splits a cluster into two. The process continues until certain termination conditions are satisfied. One or more computing devices (e.g., the network training server 110) implement operations depicted in FIG. 3 by executing suitable program code (e.g., the clustering application 140). For illustrative purposes, the process 300 is described with reference to certain examples depicted in the figures. Other implementations, however, are possible.

At block 302, the process 300 involves obtaining the risk data 142. At the beginning of the clustering process, all the risk data 142 is considered as being included in one cluster. At block 304, the process 300 involves selecting an existing cluster for splitting. If there is only one existing cluster (such as at the beginning of the clustering process), this one cluster is selected for splitting. If there is more than one existing cluster, a splitting criterion can be utilized to determine which cluster is to be selected for splitting.

Figure 4:
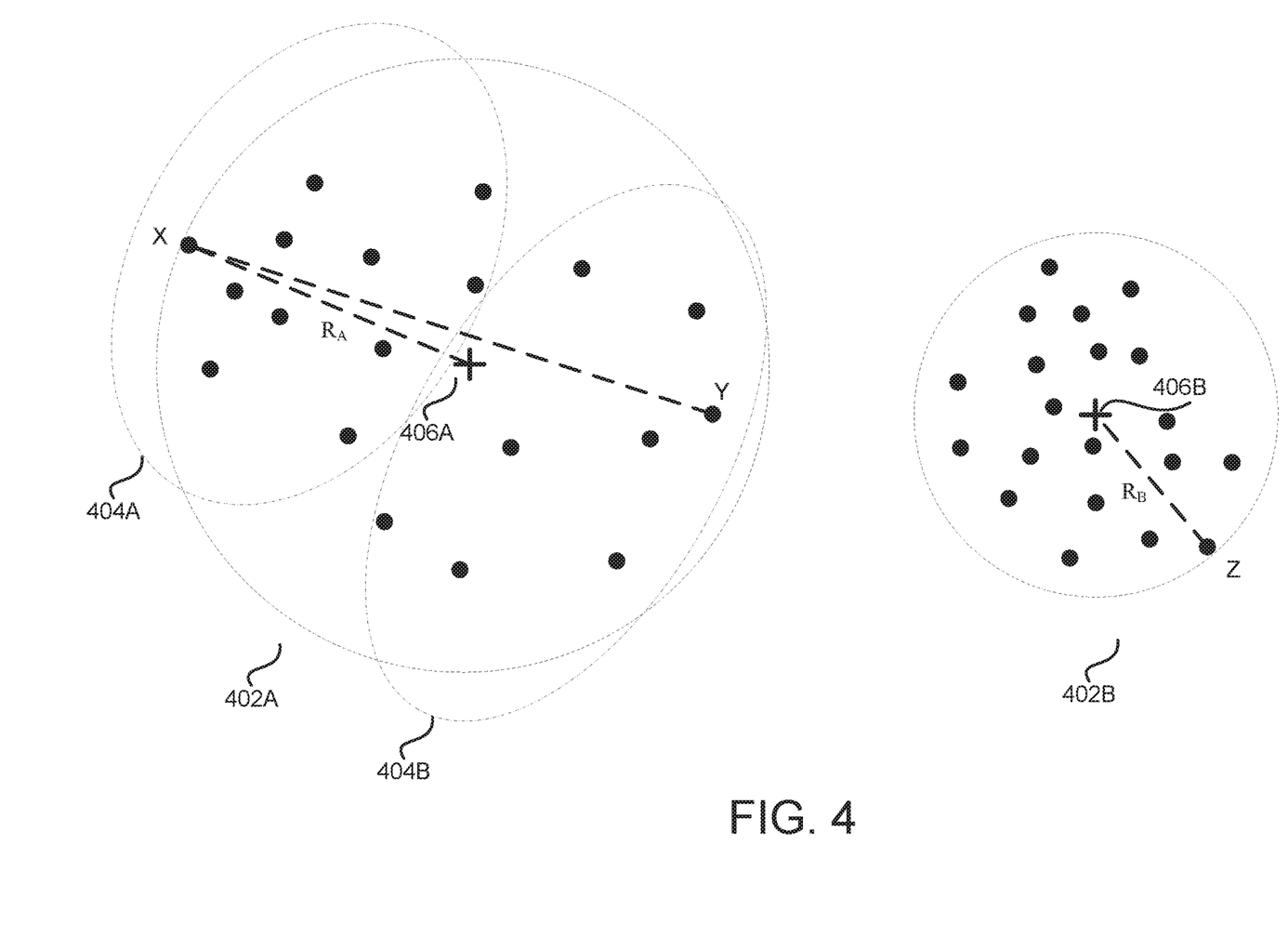
FIG. 4 is a diagram depicting an example of splitting one cluster into two clusters according to certain aspects of the present disclosure.

For example, the splitting criterion can be configured to select the largest cluster (i.e., containing the largest number of data points) among the existing clusters for splitting. In another example, the splitting criterion can be configured to select the widest cluster among the existing clusters for splitting. The width of a cluster can be measured by the radius of the cluster and the cluster having the largest radius is the widest cluster. In some examples, the radius of a cluster is defined as the largest distance or the average distance between the centroid of the cluster and a data point in the cluster. FIG. 4 shows an example of the risk data 142 after being split into two clusters 402A and 402B. In FIG. 4, each dot represents a data point in the high-dimensional space. The cross sign "+" denotes the centroids of the respective clusters. In cluster 402A, data point X has the largest distance from the centroid 406A of the cluster. If the radius of a cluster is defined as the largest distance between the centroid of the cluster and a data point in the cluster, the radius $R_A$ of the cluster 402A equals the distance between the centroid 406A and the data point X. Similarly, in cluster 402B, data point Z has the largest distance from the centroid 406B of the cluster. As such, the radius $R_B$ of the cluster 402B equals the distance between data point Z and the centroid 406B. Since $R_A > R_B$ in FIG. 4, cluster 402A will be selected for splitting according to the splitting criterion that selects the widest cluster for splitting. As can be seen from FIG. 4, this splitting criterion can help to prevent tight clusters (such as cluster 402B) from being split.

Alternatively, or additionally, the splitting criterion can be configured to select a cluster for splitting according to the following criterion:

$R_{2nd\ widest}/R_{widest} > TH$, select the largest cluster for splitting;

Otherwise, select the widest cluster for splitting.

Here, TH is a threshold ratio between the radius of the second widest cluster ($R_{2nd\ widest}$) and the radius of the widest cluster ($R_{widest}$). For example, TH can be set to 0.8. According to this splitting criterion, if the radii of the second widest and the widest clusters are close (i.e., the ratio $R_{2nd\ widest}/R_{widest}$ is close to 1 and higher than the threshold TH), then the largest cluster is selected for splitting; otherwise, the widest cluster is selected for splitting. This splitting criterion can help to prevent splitting a cluster that has a similar tightness as other clusters. But if the widest cluster is not as tight as other clusters, it will be selected for splitting. In the example shown in FIG. 4, assume the cluster 402B is the second widest cluster and the largest cluster, cluster 402A is the widest cluster, and the TH is set to 0.8. Because the ratio $R_B/R_A$ is smaller than 0.8, the widest cluster 402A will be selected for splitting despite that cluster 402B is the largest cluster. As can be seen from this example, this splitting criterion helps to preserve large but tight clusters.

Referring back to FIG. 3, at block 306, the process 300 involves splitting the cluster selected in block 304 into two clusters. In some examples, the splitting is performed by picking two initial cluster points from the selected cluster. The first cluster point can be selected as the data point farthest from the centroid of the cluster. The second cluster point can be selected as the data point farthest from the first cluster point. According to this method, assuming cluster 402A is selected for splitting in the example shown in FIG. 4, the first cluster point can be data point X because it is the data point in cluster 402A that is farthest from the centroid 406A. The second cluster point can be data point Y because it is the data point in the cluster 402A that is farthest from data point X. Once the two initial cluster points are selected, two new clusters can be formed. In particular, the first cluster can be formed by including data points that are closer to the first cluster point and the second cluster can be formed by including data points that are closer to the second cluster point. According to this process, in the example shown in FIG. 4, two new clusters 404A and 404B are formed by splitting cluster 402A based on the initial cluster points X and Y.

After splitting the cluster based on the two initial cluster points, the cluster centroids can be iteratively adjusted. For example, the cluster centroid for each of the two new clusters can be updated to be the centroid of the data points contained in the respective clusters. The updated cluster centroids can, in turn, be utilized to re-cluster the data points into two clusters. Each of the two updated clusters contains data points that are closer to the centroid of the cluster than the centroid of the other cluster. This process can continue until the centroids for the two new clusters become stable (e.g., the distance between the centroids of one cluster calculated in two consecutive iterations is smaller than a threshold value). In this way, the selected cluster is split into two clusters.

In the above-described processes for selecting a cluster and splitting the cluster, distances between data points in the cluster and between the data points and the centroid of the cluster are calculated. The distances can be measured, for example, using Euclidean distances. However, for data with a high dimension (e.g., higher than 10), Euclidean distance can lose the ability to adequately separate points in this high dimension space. This can be more problematic for data having a dimension as high as 100 or even 1000. To address this issue, different distance measurements can be utilized.

In some implementations, cosine distance can be employed. Cosine similarity is an angular measure between two vectors, measured at the origin. The Cosine similarity can be converted to a Cosine distance. For example, the Cosine distance between two points in a space can be defined as 1−cos (θ), where $$\cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \quad (1)$$

Here, A and B are two vectors, and θ is the angle between these two vectors. The drawback of the cosine distance is that it ignores the magnitude (which can be computed as an L2 norm or square root of the sum of squares of values in each dimension) of the vectors. As a result, two points that are not close to each other in the multi-dimensional space may have a small distance. This problem is illustrated in the left figures of FIG. 5. In the two examples shown in the left figures of FIG. 5, although data point B is much closer to A than C, the cosine distance between A and B and the cosine distance between A and C are the same.

To address this problem, a modified cosine distance can be utilized. In some examples, the modified cosine distance between data points A and B can take into account the magnitude of
A and B in the high-dimension space as follows:

$$1 - \left[ \frac{\sum_{i=1}^{n} A_i B_i}{\sqrt{\sum_{i=1}^{n} A_i^2} \sqrt{\sum_{i=1}^{n} B_i^2}} - \frac{\text{abs}\left(\sqrt{\sum_{i=1}^{n} A_i^2} - \sqrt{\sum_{i=1}^{n} B_i^2}\right)}{\sqrt{n}} \right] \quad (2)$$

Figure 5:
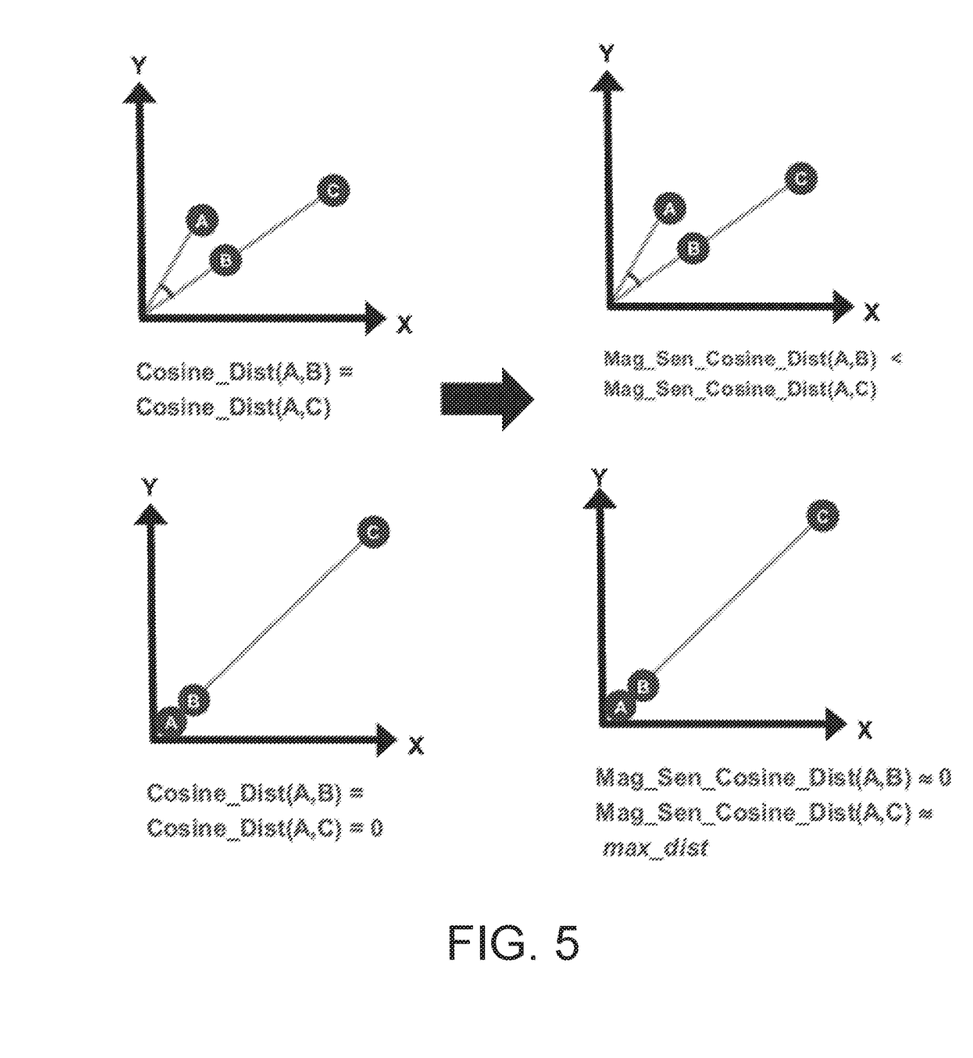
FIG. 5 is a diagram comparing the cosine distances and the magnitude sensitive cosine distances according to certain aspects of the present disclosure.

This distance is referred to herein as a magnitude sensitive cosine distance. In some implementations, this magnitude sensitive cosine distance is calculated after the value of each attribute of the data point is normalized to [−1, 1]. The right figures of FIG. 5 show the magnitude sensitive cosine distances for the scenarios shown in the left two figures in FIG. 5. As can be seen from the right figures of FIG. 5, the magnitude sensitive cosine distance between B and A is smaller than the magnitude sensitive cosine distance between A and C, which is consistent with the relative positions of these points in the multi-dimensional space.

Referring back to FIG. 3, at block 307, the process 300 involves performing m-means clustering on the input data using the centroids of the current clusters. Here, m is the total number of clusters identified so far. Note that the splitting at block 306 is performed locally in the selected cluster. The m-means clustering performed at block 307 allows the clustering to be optimized globally so that data points in one cluster are closer to the centroid of the cluster than to the centroids of other clusters. This global optimization can improve the performance of the clustering process. Further, although m-means clustering is discussed herein, any clustering algorithm can be utilized to globally cluster the input data points into m clusters based on the m cluster centroids.

At block 308, the process 300 involves evaluating the clustering results to determine the quality of the clustering. In one example, Dunn index is calculated and used to evaluate the cluster results. The Dunn index can be calculated as:

$$DI_m = \frac{\min_{1 \leq i < j \leq m} \delta(C_i, C_j)}{\max_{1 \leq k \leq m} \Delta_k} \quad (3)$$

Here, m is the number of clusters, $\delta(C_i, C_j)$ is the inter-cluster distance between clusters $C_i$ and $C_j$. $\Delta_k$ is the size of cluster $C_k$. A higher Dunn index indicates a better clustering (i.e., well separated compact clusters). A lower Dunn index, on the other hand, indicates a poorer clustering. The above standard Dunn index is generated from the most pessimistic view of the clustering quality because it considers the minimum inter-cluster distance and the maximum cluster size. For many purposes, the worst view is too extreme since the worst clusters can be discarded for many applications and only data that falls in well-defined clusters are used. As such, it might not be an accurate indicator of the quality of the clustering.

Alternatively, or additionally, a modified Dunn Index can be computed using median cluster compactness and median separation. The modified Dunn index can be formulated as:

$$\text{Modified } Dunn \text{ Index} = \frac{\text{Median}_{1 \leq i \leq j \leq m} \delta(C_i, C_j)}{\text{Median}_{1 \leq k \leq m} \Delta_k} \quad (4)$$

The modified Dunn index can provide a better insight into the clustering quality. It should be understood that the median is used herein only as an example for modifying the Dunn index and should not be construed as limiting. Various other ways to modify the Dunn index to achieve a balance between the pessimistic and optimistic view of the current clustering quality. As will be discussed in the following, the Dunn Index or the modified Dunn index can be utilized to determine the proper number of clusters.

At block 310, the process 300 involves determining whether splitting should be terminated. The conditions for terminating the splitting can include, for example, a maximum number of iterations has reached, or a maximum number of clusters has been generated. In some examples, the splitting should be terminated if all the clusters have at most a predetermined number of samples. This termination condition can ensure that the clusters are not over split into clusters smaller than expected.

Figure 6:
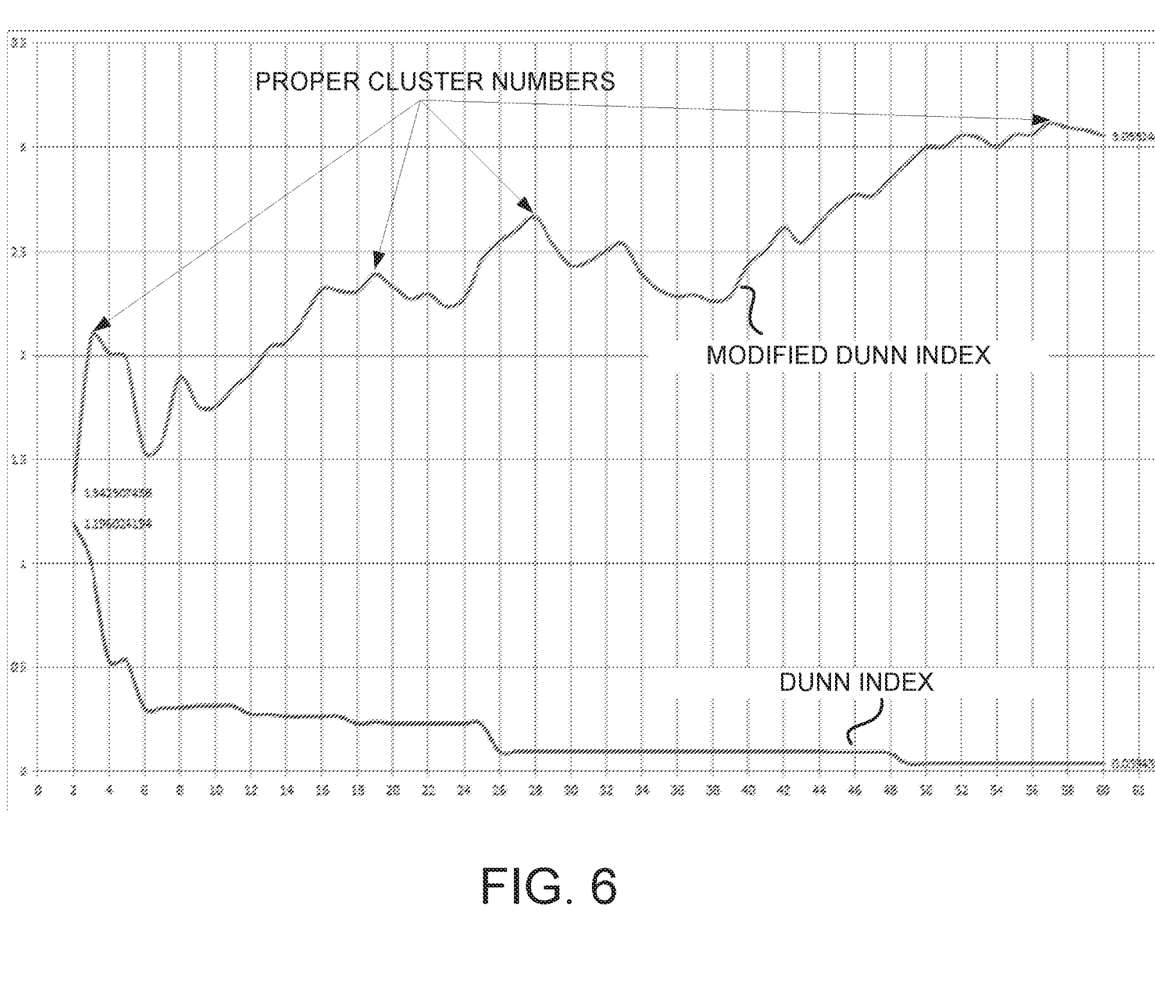
FIG. 6 is a diagram illustrating examples of the Dunn index and the corresponding modified Dunn index for different numbers of clusters generated for a set of data according to certain aspects of the present disclosure.

If none of the termination conditions is satisfied, the process 300 continues to perform the next round of splitting by selecting an existing cluster for splitting at block 304. If at least one of the termination conditions is satisfied, the process 300 terminates the splitting, and at block 312, involves determining the proper number of clusters. In some examples, the determination can be performed by examining the Dunn index or the modified Dunn index calculated above at block 308 for each iteration of the clustering. FIG. 6 shows an example of the Dunn index and the corresponding modified Dunn index for different numbers of clusters generated for a set of data. In this example, the number of clusters where the Dunn index or the modified Dunn index has a local maximum can be selected as the proper number of clusters. As can be seen from FIG. 6, cluster numbers 3, 19, 28, and 57 are proper cluster numbers according to the modified Dunn index. Note that to determine proper cluster numbers, the splitting process can be performed for a number of iterations higher than the desired number of clusters.

As discussed above, the determined proper number of clusters can be used to determine the number of user segments, thereby determining the number of hidden nodes in the hidden layer of the neural network 120. If neural network models are not used to predict the risk indicator, the determined user segments can be used to build other types of models that are used for the prediction, such as logistic regression models. One logistic regression model can be built for one user segment. To determine the number of user segments, the clustering can be performed for a number of iterations, such as 50 iterations, based on which a proper number of clusters can be selected.

To generate the neural network training samples 126, the clustering algorithm can be executed to generate finer clusters (e.g., 100 segments) to increase the representativeness of the underlying data modes by each cluster. A pre-determined amount of random samples (e.g., 1%) can be selected from each cluster to form the neural network training samples 126.

It should be understood that while the above description focuses on using data clustering to facilitate the building and training of the neural network 120 for risk prediction. The clustering presented herein can be applied to various other applications. For example, the clustering can be utilized to estimate missing attribute values in a data set. The missing attribute value of a data point in a cluster can be imputed based on neighbor points that have a value for that attribute. The neighbor points can be defined as other data points in the cluster. The clustering algorithm presented above can also be modified such that the distance between two data points can be computed even if some attributes are not available (e.g., use only attributes available in both data points). In further examples, a minimum number of overlapping attributes is required between a neighbor point and the data point. Similarly, a minimum similarity can be required for a data point to be considered a neighbor of the data point with the missing attribute value. The imputed value can be calculated as the average, weighted average, median or other statistics of the values of the nearest neighbor points.

The clustering mechanism presented herein can also be used to identify micro-segment so that users within a micro-segment can be treated similarly. For instance, recommendations made to a user, such as recommendations for content presentation or resource allocation, can be made to other users in the same micro-segment as this user. The micro-segments can be identified by setting a large number of clusters (e.g., 5000) for the splitting process. Additional conditions can be added when determining which cluster to split in each iteration. For example, if the radius of a cluster is less than a minimum radius (i.e., a very tight cluster), the cluster will not be selected for splitting. If the size of a cluster (i.e., the number of points in the cluster) is less than a minimum size, the cluster will not be selected for splitting.

In some implementations, the minimum size of a cluster can be set to be less than the size of the desired micro-segments.

Example of Computing System for Machine-Learning Operations

Figure 7:
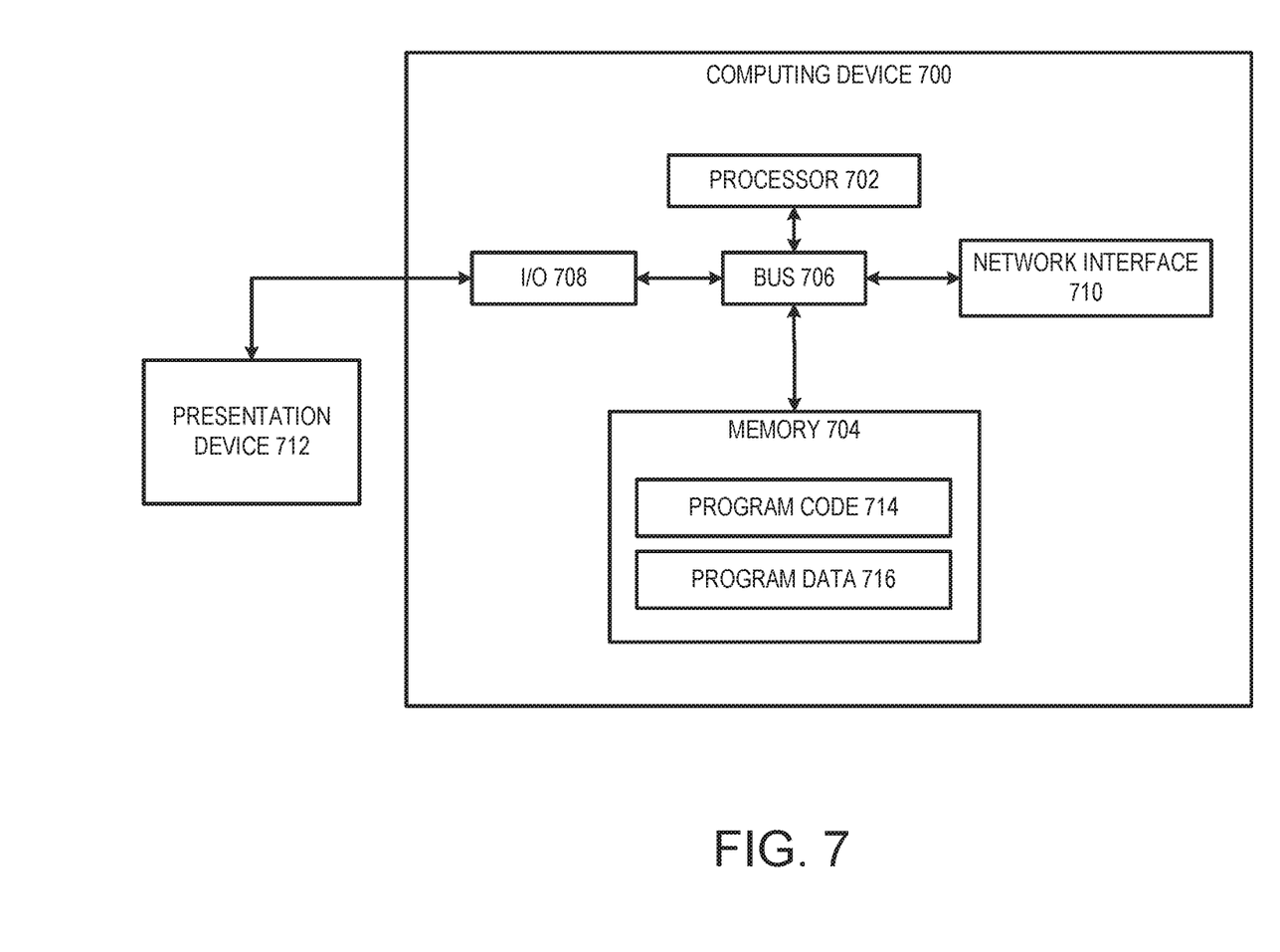
FIG. 7 is a block diagram depicting an example of a computing system suitable for implementing aspects of the techniques and technologies presented herein.

Any suitable computing system or group of computing systems can be used to perform the operations described herein. For example, FIG. 7 is a block diagram depicting an example of a computing device 700, which can be used to implement the risk assessment server 118, the network training server 110, or any other device for executing the clustering application 140. The computing device 700 can include various devices for communicating with other devices in the operating environment 100, as described with respect to FIG. 1. The computing device 700 can include various devices for performing one or more transformation operations described above with respect to FIGS. 1-6.

The computing device 700 can include a processor 702 that is communicatively coupled to a memory 704. The processor 702 executes computer-executable program code stored in the memory 704, accesses information stored in the memory 704, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 702 include a microprocessor, an application-specific integrated circuit, a field-programmable gate array, or any other suitable processing device. The processor 702 can include any number of processing devices, including one. The processor 702 can include or communicate with a memory 704. The memory 704 stores program code that, when executed by the processor 702, causes the processor to perform the operations described in this disclosure.

The memory 704 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 700 may also include a number of external or internal devices such as input or output devices. For example, the computing device 700 is shown with an input/output interface 708 that can receive input from input devices or provide output to output devices. A bus 706 can also be included in the computing device 700. The bus 706 can communicatively couple one or more components of the computing device 700.

The computing device 700 can execute program code 714 that includes the risk assessment application 114 and/or the network training application 112. The program code 514 for the risk assessment application 114, the clustering application 140 and/or the network training application 112 may be resident in any suitable computer-readable medium and may be executed on any suitable processing device. For example, as depicted in FIG. 7, the program code 714 for the risk assessment application 114, the clustering application 140 and/or the network training application 112 can reside in the memory 704 at the computing device 700 along with the program data 716 associated with the program code 714, such as the predictor variables 124, the risk data 142, and/or the neural network training samples 126. Executing the risk assessment application 114, the clustering application 140, or the network training application 112 can configure the processor 702 to perform the operations described herein.

In some aspects, the computing device 700 can include one or more output devices. One example of an output device is the network interface device 710 depicted in FIG. 7. A network interface device 710 can include any device or group of devices suitable for establishing a wired or wireless data connection to one or more data networks described herein. Non-limiting examples of the network interface device 510 include an Ethernet network adapter, a modem, etc.

Another example of an output device is the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the computing device 700 using one or more data networks described herein. In other aspects, the presentation device 712 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method that includes one or more processing devices performing operations comprising:
   receiving, from a remote computing device, a risk assessment query for a target entity;
   computing, responsive to the risk assessment query, an output risk indicator for the target entity by applying a neural network model to predictor variables associated with the target entity, wherein:
   the neural network model comprises a hidden layer containing an equal number of nodes as a number of clusters in a first set of clusters of a dataset,
   the neural network model is trained based on training samples selected from a second set of clusters of the dataset, and
   a number of clusters in the second set of clusters is higher than the number of clusters in the first set of clusters; and
   transmitting, to the remote computing device, a responsive message including the output risk indicator, wherein the output risk indicator is usable for controlling access to one or more interactive computing environments by the target entity.

2. The method of claim 1, wherein the training samples are selected from the second set of clusters by taking a number of samples from each of the second set of clusters in proportion to a size of the respective clusters.

3. The method of claim 1, wherein the second set of clusters of the dataset is generated by a clustering process comprising iteratively splitting the dataset into clusters, wherein each iteration comprises:
   selecting an existing cluster for splitting based on a splitting criterion;
   splitting the selected cluster into two clusters;
   determining centroids of existing clusters; and splitting the dataset into a number of clusters equal to a total number of the existing clusters based on the centroids of the existing clusters.

4. The method of claim 3, wherein each iteration further comprises:
calculating a Dunn index or a modified Dunn index for the existing cluster.

5. The method of claim 4, wherein the clustering process further comprises:
determining a proper number of clusters for the dataset by determining a number that achieves a local maximum in the calculated Dunn index or the modified Dunn index.

6. The method of claim 3, wherein each iteration further comprises:
determining termination of the iterative splitting by determining that a termination condition is satisfied, wherein the termination condition comprises one or more of: a maximum number of iterations has reached, a maximum number of clusters has been generated, or a size of each of the existing clusters is no more than a pre-determined size.

7. The method of claim 3, wherein the splitting criterion specifies that if a ratio between radii of a second widest and a widest cluster is higher than a threshold ratio, then a largest cluster is selected for splitting, otherwise, the widest cluster is selected for splitting.

8. The method of claim 3, wherein splitting the selected cluster into two clusters comprises:
determining a first cluster point by selecting a data point in the selected cluster that is farthest from a centroid of the cluster;
determining a second cluster point by selecting a data point farthest from the first cluster point;
generating a first cluster by including data points in the selected cluster that are closer to the first cluster point;
generating a second cluster by including data points in the selected cluster that are closer to the second cluster point;
determining a first centroid of the first cluster based on the data points in the first cluster and a second centroid of the second cluster based on the data points in the second cluster; and
updating the first cluster and the second cluster based on the first centroid and the second centroid.

9. The method of claim 8, wherein a distance between two data points is calculated using magnitude sensitive cosine distance.

10. The method of claim 1, wherein the neural network model further comprises a second hidden layer and wherein the second hidden layer contains an equal number of nodes as a number of clusters in a third set of clusters generated by clustering outputs of the hidden layer of the neural network model.

11. The method of claim 1, wherein training the neural network model comprises:
training a logistic regression model for each cluster in the first set of clusters;
initializing parameters associated with the hidden layer to be parameters of the logistic regression model; and
determining remaining parameters of the neural network model by training the neural network model using the training samples selected from the second set of clusters.

12. A system comprising:
a processing device; and
a memory device in which instructions executable by the processing device are stored for causing the processing device to perform operations comprising:
clustering a dataset into a set of clusters;
generating training samples from the set of clusters by obtaining a number of samples from each of the set of clusters in proportion to a size of the respective clusters, the training samples comprising training predictor variables and training outputs corresponding to the training predictor variables;
training a neural network model for computing a risk indicator from predictor variables based on the training samples; and
outputting the neural network model for use in computing, responsive to a risk assessment query for a target entity, an output risk indicator for the target entity from predictor variables associated with the target entity.

13. The system of claim 12, wherein clustering the dataset into the set of clusters comprises iteratively splitting the dataset into clusters, wherein each iteration comprises:
selecting an existing cluster for splitting based on a splitting criterion;
splitting the selected cluster into two clusters based on distances between data points in the selected cluster;
determining centroids of existing clusters; and
splitting the dataset into a number of clusters equal to a total number of the existing clusters based on the centroids of the existing clusters.

14. The system of claim 13, wherein the operations further comprise:
clustering the dataset into a second set of clusters; and
setting a number of nodes in a hidden layer of the neural network model to be the number of clusters in the second set of clusters, wherein a number of clusters in the set of clusters is higher than a number of clusters in the second set of clusters.

15. The system of claim 14, wherein the operations further comprise:
training a logistic regression model for each cluster in the second set of clusters;
initializing parameters associated with the hidden layer of the neural network model to be parameters of the trained logistic regression model; and
determining remaining parameters of the neural network model by training the neural network model using the training samples generated from the set of clusters.

16. A non-transitory computer-readable storage medium having program code that is executable by a processor device to cause a computing device to perform operations, the operations comprising:
accessing a neural network model configured for computing a risk indicator from predictor variables, wherein the neural network model is trained based on training samples selected from a set of clusters of a dataset, the training samples comprise training predictor variables and training outputs corresponding to the training predictor variables and are selected from the set of clusters by obtaining a number of samples from each of the set of clusters in proportion to a size of the respective clusters;
computing, responsive to a risk assessment query for a target entity received from a remote computing device, an output risk indicator for the target entity by applying the neural network model to predictor variables associated with the target entity; and transmitting, to the remote computing device, a responsive message including the output risk indicator.

17. The non-transitory computer-readable storage medium of claim 16, wherein a number of nodes in a hidden layer of the neural network model is the same as a number of clusters in a second set of clusters of the dataset, wherein a number of clusters in the set of clusters is higher than a number of clusters in the second set of clusters.

18. The non-transitory computer-readable storage medium of claim 16, wherein the set of clusters is generated by clustering the dataset via iteratively splitting the dataset into clusters, wherein each iteration comprises:
    selecting an existing cluster for splitting based on a splitting criterion;
    splitting the selected cluster into two clusters;
    determining centroids of existing clusters; and
    splitting the dataset into a number of clusters equal to a total number of the existing clusters based on the centroids of the existing clusters.

19. The non-transitory computer-readable storage medium of claim 18, wherein each iteration further comprises calculating a Dunn index or a modified Dunn index for the existing clusters, and wherein the operations further comprise determining a proper number of clusters for the dataset by determining a number that achieves a local maximum in the calculated Dunn index or the modified Dunn index.

20. The non-transitory computer-readable storage medium of claim 17, wherein the neural network model further comprises a second hidden layer, and wherein the second hidden layer containing an equal number of nodes as a number of clusters in a third set of clusters of the dataset generated by clustering outputs of the hidden layer of the neural network model.

\* \* \* \* \*